US006286041B1

(12) United States Patent
Collins, III et al.

(10) Patent No.: US 6,286,041 B1
(45) Date of Patent: *Sep. 4, 2001

(54) SYSTEM FOR SOFTWARE DISTRIBUTION IN A DIGITAL COMPUTER NETWORK

(75) Inventors: Theodore Joseph Collins, III, St. Paul; Scott Roy Anderson, Eden Prairie; Steven J. McDowall, Coon Rapids; Charles Henry Kratsch, Lino Lakes; Joseph Paul Larson, Golden Valley, all of MN (US)

(73) Assignee: Computer Associates Think, Inc., Islandia, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/658,968

(22) Filed: Sep. 11, 2000

Related U.S. Application Data

(63) Continuation of application No. 08/993,430, filed on Dec. 18, 1997, now Pat. No. 6,138,153, which is a continuation of application No. 08/723,051, filed on Sep. 30, 1996, now Pat. No. 5,845,090, which is a continuation of application No. 08/194,925, filed on Feb. 14, 1994, now abandoned.

(51) Int. Cl.[7] .................................................. G06F 15/177

(52) U.S. Cl. ........................ 709/221; 709/217; 709/218; 709/219; 709/220; 709/201; 709/202

(58) Field of Search .................................... 709/217, 218, 709/219, 220, 221, 201, 202

(56) References Cited

U.S. PATENT DOCUMENTS

| 4,999,806 | 3/1991 | Chernow et al. . |
| 5,155,837 | 10/1992 | Liu et al. . |
| 5,155,847 | 10/1992 | Kirouac et al. . |

(List continued on next page.)

OTHER PUBLICATIONS

Frye, Inc. "Software Undate and Distribution System", version 1, 1992.
"StarSENTRY Software Manager 2.1", User's Guide, (May 1994).
C.H. Kratsch et al., "Electronic Software Distribution: The Key to Distributed Computing", White Paper, Nov. 1993.
B. Kirwin; "Getting the Code to the Node"; Paper presented to Twelfth Annual Office Automation Systems Conference.
B. Freedman; "Software Vendors Bet Big on Electronic Distribution"; PC Week; p. 133.
J. Huntington–Lee, Excellence Award: ViaTech's Xfer, Managing Distributed Systems Newsletter, Jan. 1994.
Hewlett Packard, HP Distributed Management Environment (DME) Technologies, Jun., 1993, (Marketing Literature).
Open Software Foundation (OSF), OSF Distributed Management Environment Rationale, Sep., 1991, (Discussion Paper).

(List continued on next page.)

Primary Examiner—Zarni Maung
Assistant Examiner—Nabil El-Hady
(74) Attorney, Agent, or Firm—Cooper & Dunham LLP (57) ABSTRACT

A system and method for transferring digital computer software and data from one digital computer to one or more digital computers through a network of electrical connections between the two or more digital computers. An installation agent is established at each target machine and software to be transferred is placed within a software package, wherein the software package includes the software and installation commands for installing the software. The software package is transferred to each target machine and installed by alerting the installation agent that a software package has arrived and executing commands within the installation agent to send an install message to the software package, wherein the install message causes the software package to execute the installation commands.

24 Claims, 8 Drawing Sheets

U.S. PATENT DOCUMENTS

| | | |
|---|---|---|
| 5,247,683 | 9/1993 | Holmes et al. . |
| 5,367,683 | 11/1994 | Brett . |
| 5,367,686 | 11/1994 | Fisher et al. . |
| 5,410,703 | 4/1995 | Nilsson et al. . |
| 5,421,009 | 5/1995 | Platt . |
| 5,421,017 | 5/1995 | Scholz et al. . |
| 5,434,999 | 7/1995 | Goire et al. . |
| 5,638,494 | 6/1997 | Pinard et al. . |
| 5,652,887 | 7/1997 | Dewey et al. . |
| 5,655,081 | 8/1997 | Bonnell et al. . |
| 5,838,918 * | 11/1998 | Prager et al. .......... 709/221 |
| 5,845,090 * | 12/1998 | Collins, III et al. ......... 709/221 |
| 6,138,153 * | 10/2000 | Collins, III et al. ......... 709/221 |

OTHER PUBLICATIONS

Kristin Marks, Easy Transport, LAN Magazine, Jul., 1993.

Legent Corporation, Electronic Software Distribution, May, 1993, (Marketing Literature).

NCR Corporation, StarSENTRY Software Management, Oct., 1992, (Marketing Literature).

Tivoli Corporation, Tivoli/Courier, Jun., 1993, (Marketing Literature).

Bill Kirwin, Software Distribution: Getting the Code to the Node, May, 1993, (Paper presented to Twelfth Annual Office Automation Systems Conference).

J. William Semich, "Control Thousands of Desktop Apps!" Datamation, Dec. 12, 1993: p. 18.

Steven J. Vaughan, "Reach Out and Touch Someone With RemoteWare", PC Computing, Dec., 1993, p. 146. Paula Musich, "Frye adds WAN support to NetWare distribution software", PC Week, Nov. 29, 1993: p. 49.

Mary Jo Foley, "Sun unit ships downsizing tools", PC Week, Nov. 22, 1993: p. 41.

Jean S. Bozman, "Software distribution key to open systems", Computerworld, Oct. 18, 1993: p. 85.

Eric Smalley, Banyan plans file distributor, PC Week, Oct. 4, 1993: p. 22.

Matt Kramer, "LAN software maintenance made easier", PC Week, Jan. 18, 1993: p. 63.

Steve Higgins, "Reach to ship software–distribution system", PC Week, Nov. 9, 1992: p. 27.

Stephan Loudermilk, "Startup releases client/server distribution system", PC Week, Nov. 2, 1992: p. 6.

Beth Freedman, "Software Vendors Bet Big on Electronic Distribution", PC Week, Jul. 6, 1992: p. 133.

Rosemary Hamilton, "Tools on way to track micro packages", Computerworld, May 11, 1992: p. 1.

Paula Musich, "Spectrum Offering Will Fill NetWare Hole", PC Week, Jun. 17, 1991: p. 4.

* cited by examiner

SYSTEM FOR SOFTWARE DISTRIBUTION IN A DIGITAL COMPUTER NETWORK

This is a continuation of Ser. No. 08/993,430, filed Dec. 18, 1997, U.S. Pat. No. 6,138,153 which is a continuation of Ser. No. 08/723,051 filed Sep. 30, 1996, U.S. Pat. No. 5,845,090 which is a continuation of Ser. No. 08/194,925 filed Feb. 14, 1994, now abandoned.

TECHNICAL FIELD

The present invention pertains to the field of digital computing equipment, and particularly to the application of computing equipment to distributed networks of computer networks.

BACKGROUND OF THE INVENTION

Digital computing equipment (computers) are often electrically connected to other digital computer equipment through internetworks of wiring and software. Each computer in an internetwork requires programs and data (software) to operate. Traditionally, software is entered into a computer through removable magnetic media, such as magnetic tape or removable disks. Because each computer in a large internetwork requires its own copy of software, and since a relatively few administrators must install and update software on every computer in a network, distributing software throughout a network by traditional techniques is time-consuming, error-prone, or impractical.

Distributing software by transmitting it through the network between computers is known in the art as Electronic Software Distribution (ESD). ESD can reduce the number of administrators required to install and update software in a network, and improve the speed and accuracy of software distribution. Existing software distribution techniques, however, are often unreliable, inefficient, and incomplete. The present invention is an improvement over existing techniques, employing advanced processes and methods of ESD.

SUMMARY OF THE INVENTION

The present invention is a system and method for transferring digital computer software and data from one digital computer to one or more digital computers through a network of electrical connections between the two or more digital computers. An installation agent is established at each target machine and software to be transferred is placed within a software package, wherein the software package includes the software and installation commands for installing the software. The software package is transferred to each target machine and installed by alerting the installation agent that a software package has arrived and executing commands within the installation agent to send an install message to the software package, wherein the install message causes the software package to execute the installation commands.

DETAILED DESCRIPTION OF THE PREFERRED EMBODIMENT

The present invention is a means of distributing software in a digital computer network by using the network to transmit Software Packages. Software Packages are the fundamental unit of transfer in the present invention. Packages are transferred between a Network Management Server and Distribution Targets. Any digital computer electrically connected to the network is a potential Distribution Target, while one or more computers are pre-designated as the Network Management Server for a given network. There are three types of Software Packages: Distribution Packages, Collection Packages, and Command Packages. Distribution Packages contain methods and data for installing computer programs and data on one or more Distribution Targets. Collection Packages contain methods for collecting data from Distribution Targets (in this context called Collection Targets), and forwarding that data to one Distribution Target (in this context called a Collection Receiver). Command Packages contain methods for accomplishing a system administration task on a Distribution Target (in this context called a Command Target).

This detailed narrative describes the invention in terms used in the art. Specifically, an object is an entity which contains data and methods. Data is generic information represented in digital form. Methods are programs or instructions operable on a digital computer, which, when applied to the data of an object, produce a desired and consistent result.

Figure 1:
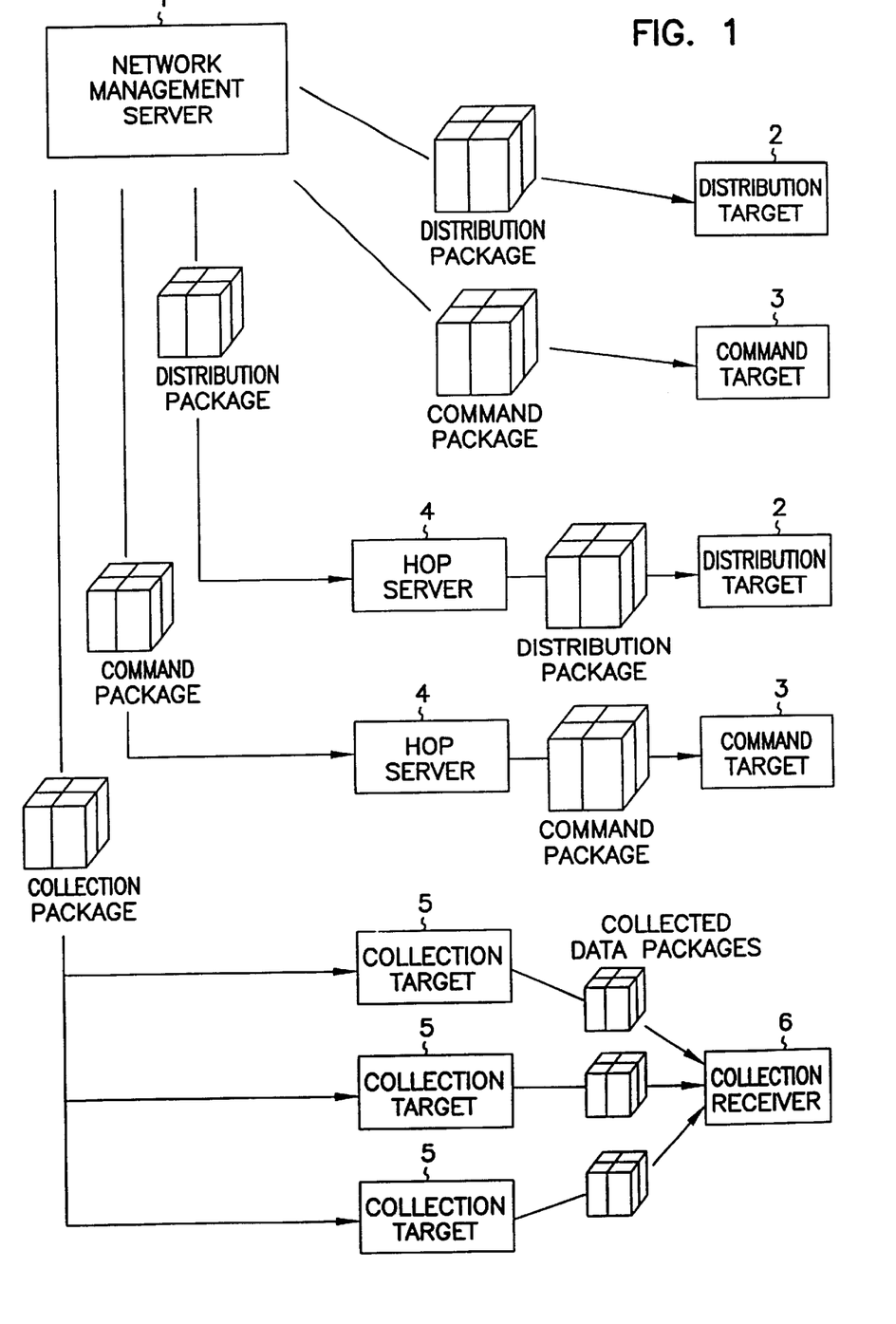
FIG. 1 is a block diagram of the functions accomplished by the present invention.

FIG. 1 is a block diagram of the functions accomplished by the present invention. The Network Management Server (NMS) (1) is a digital computer electrically connected to one or more internetworks, and pre-designated as the NMS. The NMS acts as the central repository of Software Packages for the network. It also acts as the central distribution point for Software Packages for the network. An alternative embodiment includes one or more NMS platforms, with one acting as the "Master" NMS for the enterprise internetwork.

A Distribution Target (2) is another digital computer electrically connected to the NMS through one or more internetworks. A Distribution Target receives Software Packages from the NMS, and sends a digital message to the Package to initiate the installation. Each Distribution may be scheduled on the NMS to occur on or after a specific point in time, or to occur periodically without further manual intervention by a system administrator on the NMS. Each Distribution may send one or more packages to one or more Distribution Targets.

A Command Target (3) is another name for a Distribution Target when it receives and acts on a Command Package. Command Packages are identical to Distribution Packages, except that they contain a different set of methods. The methods contained in a Distribution Software Package act, among other things, to unpack data from the Software Package and install it on a Distribution Target. The methods contained in a Command Package, by contrast, act on data to perform a system administration function on the Command Target.

A Hop Server (4) is a digital computer which stores a Software Package and then forwards it to one or more Distribution Targets. Although not pictured, all three types of Software Packages may be transmitted through a Hop Server. The purpose of a Hop Server is to reduce network traffic across slow and expensive resources, such as Wide Area Networks (WANs). Hop Servers enable the NMS to transmit a Software Package once to the Hop Server, which in turn can forward the Package to many Targets on its Local Area Network (LAN). Although not pictured, Hop Servers may distribute to additional Hop Servers.

Both the NMS and Hop Servers employ a technique known as Transmission Windows. A Transmission Window is a configurable parameter on the NMS and Hop Server(s) which sets the maximum number of simultaneous transmissions which can occur at a given time. As one transmission completes, another is started, until all Targets for a Distribution have received the Software Package. Since digital computers can submit data for transmission across a network faster than the network can communicate the data to the receiver, this technique requires mechanisms to limit the number of simultaneous transmissions. One limit is identified above, a limit on the maximum number of concurrent transfers. This limit, however, does not solve a potential problem in internetworks which do not guarantee end-to-end reliable transmissions. For example, frame relay networks do not guarantee that data sent will be transmitted to the ultimate destination. This means that data messages can and are discarded as the NMS transmits to a remote Target across progressively slower frame relay links. The data loss is compensated for by re-transmission of the discarded data, but as network traffic increases, the number of re-transmissions can exceed the volume of data being transmitted correctly.

Therefore, the present invention also employs a technique referred to here as Congestion Control Groups. A Congestion Control Group is a set of two or more Targets which should not receive simultaneous transmissions. One or more Targets are assigned to at most one Congestion Control Group. Each Congestion Control Group is assigned a maximum number of concurrent transmissions to its members (n). When a distribution starts the NMS and Hop Servers scan and periodically re-scan the list of Targets which are candidates for immediate transmission. The NMS or Hop Server cross-references the list of Congestion Control Group members currently receiving transmissions. If candidate Target is a member of a Congestion Control Group and n members of that group are presently receiving a transmission, then that candidate is disqualified from the current scan. Transmission to that candidate Target cannot begin until n−1 or fewer members of that group are currently receiving transmissions.

Although not pictured, one or more Targets may be grouped for convenience. A Software Package can then be transmitted to a group of Targets, rather than an individual target. Groups of Targets which all share the same mission-critical software can be grouped in a special set called a Profile. All members of a Profile have identical mission-critical software. Software Packages which are marked as Profile Software Packages may only be transmitted to one or more pre-specified Profiles. Before a Profile Software Package may be transmitted to a Profile, it must be certified by a system administrator as error-free. Profile Software Packages must be sent to the Profile members in the order in which it was certified. That is, if Profile Software Packages A, B, and C were certified in that order, then B cannot be transmitted to the Profile members until A has been successfully transmitted. Similarly, C cannot be transmitted before B. Software Packages, therefore, carry an attribute identifying whether they are Profile Software Packages.

A Collection Target (5) is another name for a Distribution Target when it receives and acts on a Collection Package. Collection Packages are similar to Distribution Packages, except that they list the data to be collected from the Collection Target. When the data is collected into a Software Package, it is then sent to a Collection Receiver (6). A Collection Package may be sent to one or more Collection Targets, but each Collection Package must specify exactly one Collection Receiver, which receives all the collected data. The Collection Receiver may be the same digital computer as the NMS.

A single digital computer may be at one time a Distribution Target, a Command Target, a Hop Server, and a Collection Target.

Figure 2:
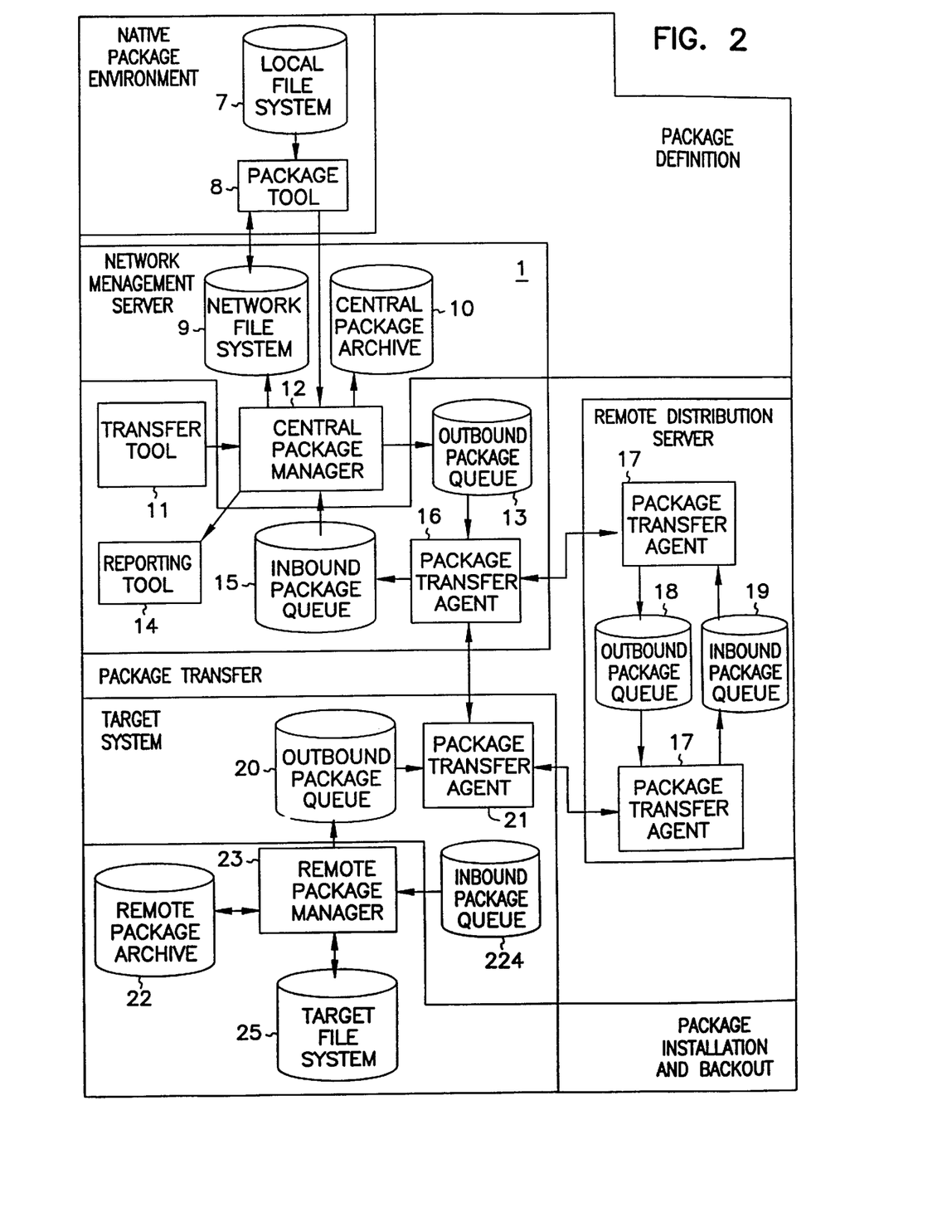
FIG. 2 is a detailed block diagram of the functional components employed by the present invention.

FIG. 2 shows a detailed block diagram of the functional components employed by the present invention. There are four generic digital computing environments indicated: Native Package, Network Manager Server, Remote Network Management Server, and Target System. The Native Package environment is the starting point for all packages. That is, all packages must be created in the native computing environment where they will ultimately be installed. For example, if a package is created for a personal computer (PC), it must be authored on a PC. The Network Management Server Environment is a multi-user digital computer, which excels at networking. It initiates transfers and reports status. The Remote Distribution Server environment is an optional environment, which can become a Hop Server (discussed above), a Staging Server (discussed below), or both. The Target System environment is the digital computer or computers which receives a transfer, either distribution, collection, or command. In this discussion, the term Software Package indicates a generic Package of type Distribution, Collection, or Command.

As the figure shows, these four environments support the three basic unctions of the invention: Package Definition, Package Transfer, and Package Installation and Backout. Package Definition means that all the attributes of a package are specified, and the data is provided for the package. Package Transfer means that the package is transmitted via the internetwork to one or more Targets, optionally through a Remote Distribution Server. At the Target, the Package is installed. That is, software operable on the Target digitally messages the Software Package to install itself. If the installation fails, or if the Package is of type Backout (discussed below), then the Package receives a digital message to backout instead of install.

All packages are constructed by using one or more tools on the local file system (7) of a Native Package digital computer. Files, scripts and data are drawn from this file system by using a software program called a Package Tool (8). The Package Tool enables the user to specify the following attributes for each package: (1) name, description and identifier for the package, (2) type of package (distribution, collection, or command), (3) name of author, (4) specific attributes of the methods, and (5) an optional assigned profile.

The Package Tool also enables the user to specify the package contents, including data files and methods.

In addition to raw network transmission, the network file system (9) is a means by which the Package Tool (8) can transfer its information to the Central Package Manager (12). The Central Package Manager (12) maintains the Central Package Archive (10), which is the central repository of all Software Packages for an enterprise. The Central Package Archive (10) may physically be placed on several digital computers, and need not be restricted to one computer. Once a Software Package is stored in the Central Package Archive (10), it may be transferred using the rest of the invention.

The Transfer Tool (11) is a computer program which accesses the Central Package Archive (10) to schedule transfers or one or more Software Packages. The Transfer Tool enables the user to specify the following attributes of a transfer: (1) name, description, and identifier for the transfer, (2) type of transfer (distribution, collection or command), (3) name of administrator scheduling transfer, (4) specific values for methods, (5) date and time for transmission, (6) date and time for installation, (7) specific attributes of backout image, (8) frequency of transfer (one-time or recurring), and (9) target for transfer (target computer, group, or profile).

Once a Software Package is scheduled for transmission via the internetwork to a target computer, group, or Profile, an indication is stored in the Outbound Package Queue (13). The Package Transfer Agent (16) program acts on this indication, and transfers the Package from the Central Package Archive (10) to the Target System, optionally through one or more Remote Distribution Servers. Return notifications from computers other than the Network Management Server are received by the Package Transfer Agent (16) and the Inbound Package Queue (15) to reach the Central Package Manager (12) and ultimately the Central Package Archive (10). The Reporting Tool (14) draws this information from the Central Package Archive (10) and Central Package Manager (12) to produce status reports on Packages and Transfers.

If a given Target System for a transfer is specified in the Central Package Manager to receive its transfers through a Hop Server or Staging Server, then the Software Package is transmitted to that computer by the Package Transfer Agent (17). The Hop or Staging Server receives the Software Package through its own Package Transfer Agent (21), which places it on its own Outbound Package Queue (18). Return notifications are placed by the Package Transfer Agent (17) on its own Inbound Package Queue (19), for transmission to the Network Management Server. The Package Transfer Agent transmits Packages on its Outbound Package Queue (18) to one or more Target Systems, which receive the Package through their Package Transfer Agent (21).

The Package Transfer Agent (21) on the Target System places packages on the Inbound Package Queue (24). The Remote Package Manager (23) acts on these queue entries to install or backout the Software Packages. The Remote Package Manager (23) returns indications to the Network Management Server by placing them on its own Outbound Package Queue (20), where the Package Transfer Agent (21) transmits them to the Network Management Station. In acting on a transmitted Software Package, the Remote Package Manager manipulates the local file system (25), and stores backout images in the Remote Package Archive (22) when appropriate.

Figure 3:
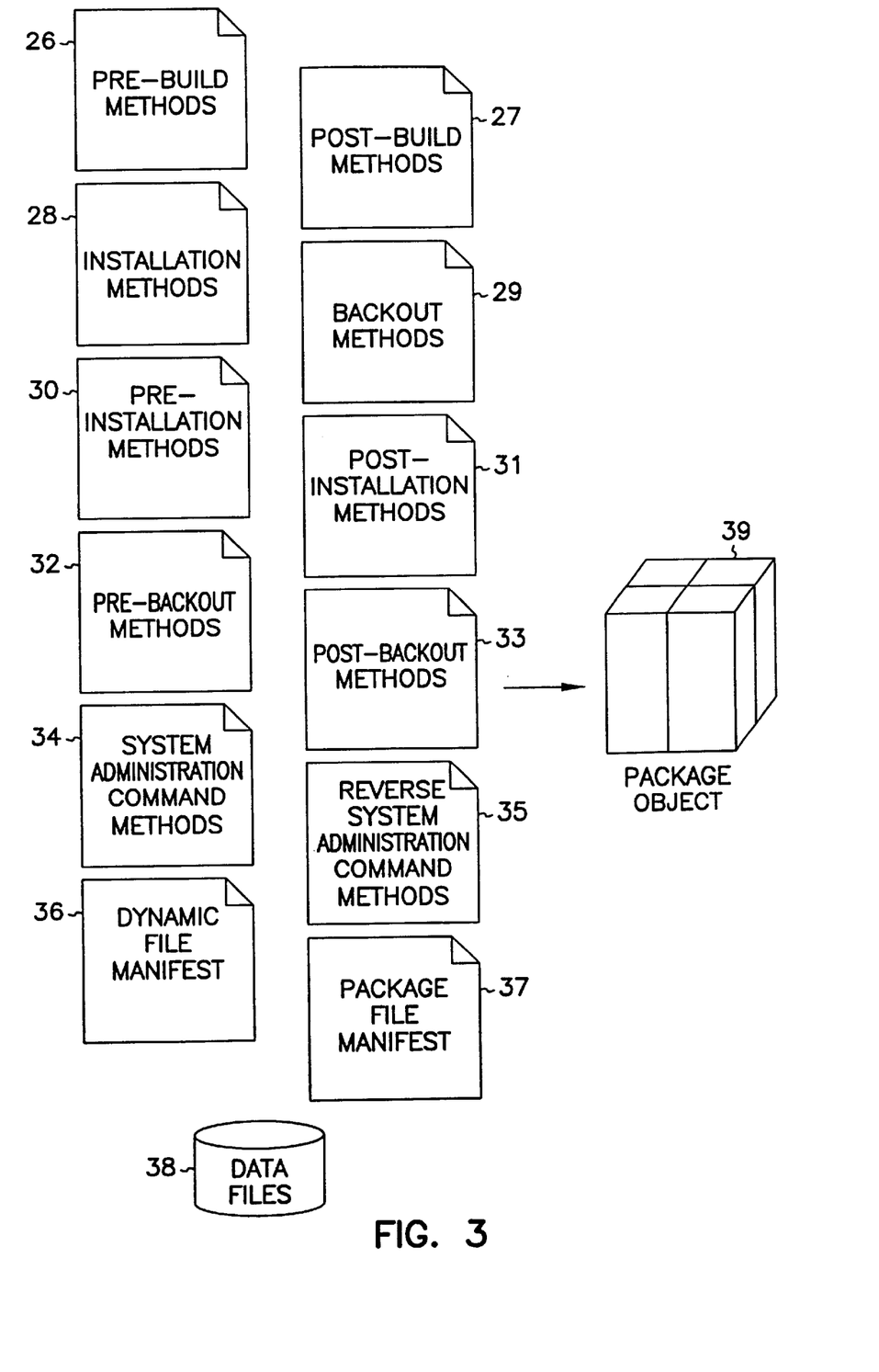
FIG. 3 is a diagram of the components of a Software Package (Package), which is the fundamental unit of transfer in the present invention.

FIG. 3 is a diagram of the components of a Software Package (Package), which is the fundamental unit of transfer in the present invention. The figure shows the Package (39) as an object, which is an entity containing both data and methods to act on that data. Methods may include, among other things, programs, scripts, instructions, additional data, and protocols. Methods are activated on the computer by messaging the appropriate method. That is, an agent program may initiate an installation by sending an "install" message to a Package.

A Package (39) may contain a pre-build method (26) which is messaged prior to assembling the package data files each time the package is transferred. For example, information may be extracted from a database, and placed into the Central Package Archive prior to building the package for transfer each time it is transferred. A Package may contain a post-build method (27), which is messaged after the build is complete each time a package is transferred. A Package will contain both installation (28) and backout methods (29). A Package may contain a pre-install method (30), which is messaged on each target computer prior to installing the Package. A Package may contain a post-install method (31), which is messaged after a successful installation on the target computer. A Package may contain a pre-backout method (32) which is messaged prior to backing the Package out on the Target computer. A Package may contain a post-backout method (33) which is messaged after a successful backout of the Package on the Target computer. A Command Package may contain a System Administration Command method (34), which performs some system administration function on the Target computer. A Command Package may contain a Reverse System Administration Command method (35) which reverses the effects of the System Administration Command method (34). A Distribution or Collection Package may contain a Dynamic File Manifest (36) which specifies the files to collect at package build time on the NMS, or at data collection time on the Target system. The Package must contain a Package File Manifest (37), specifying the files contained in the Package (if any), their attributes, and their sizes. Finally, the Package may contain data files (38), binaries, text, executables, etc. for transmission to the Target computer.

Figure 4:
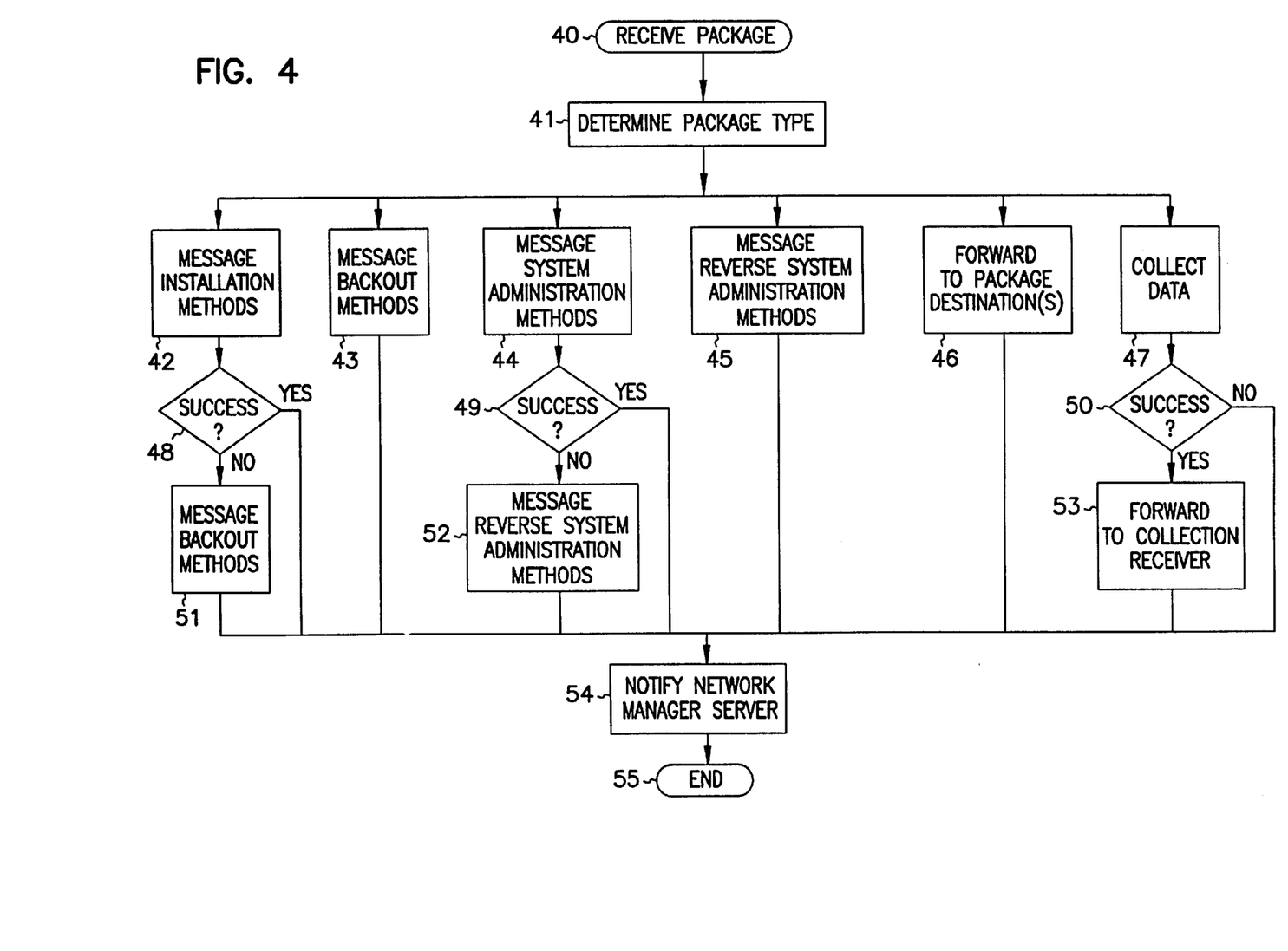
FIG. 4 is a block flow diagram of the functional components of the Remote Package Manager, which is the computer program which executes on a software distribution target.

FIG. 4 shows the actions taken by the Package Transfer Agent and Remote Package Manager (21, and 23 in FIG. 2) when operating on Packages in the Inbound or Outbound Package Queues (24, and 20 in FIG. 2). The Package Transfer Agent and Remote Package Manager may be combined into the same computer program, and will be referred to collectively here as Transfer Daemon.

The Transfer Daemon begins (40) by determining the Package Type (41), and acting accordingly. If the Package Type is Distribution, then it messages the Package to begin installation. The package then optionally messages a pre-install method, makes a backout image of data files affected by the Package as specified in the Package File Manifest (37 in FIG. 3), and installs the files into the Target's file system. If any of these steps fails (48), then the Transfer Daemon messages the backout methods (51) to reverse the affects of the package on the system. If the Package Type is Distribution Backout, then the Transfer Daemon messages the Software Package to initiate its backout methods (43). This includes optionally messaging the pre-backout methods, restoring the backout image of the affected files, and messaging the post-backout methods.

If the Package Type is Command, then the Transfer Daemon messages the Package to initiate the System Administration methods (44). If these methods fail (49), then the Transfer Daemon messages the Package to initiate Reverse System Administration methods (52). These methods should reverse the effects of the System Administration methods on the Target computer. If the Package Type is Backout Command, then the Transfer Daemon messages the Package to initiate Reverse System Administration methods (45).

If the Package Type is Hop Server, then the Transfer Daemon forwards the Package unmodified to the next one or more Targets (46). These Targets may be another Hop Server, or the ultimate destination for this transfer. If one of the specified Targets for the transmission is itself, the Transfer Daemon replaces a modified copy of the Package on its Inbound Package Queue for subsequent processing as if it were newly arrived.

If the Package Type is Collection, then the Transfer Daemon messages the Package to initiate data collection (47) on the Target. If the collection is a success (50), then the collected data is placed in Package format, and transmitted to the specified Collection Receiver (53).

At every step, the Transfer Daemon notifies the NMS of its progress and result (54). When complete (55), the Transfer Daemon re-scans its Inbound Package Queue for additional work.

Figure 5:
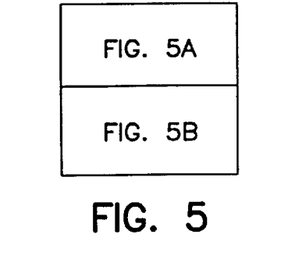
FIG. 5 is a block diagram of the functions performed by the Remote Package Manager when it is acting as a Staging Server for a software distribution target.
Figure 5A:
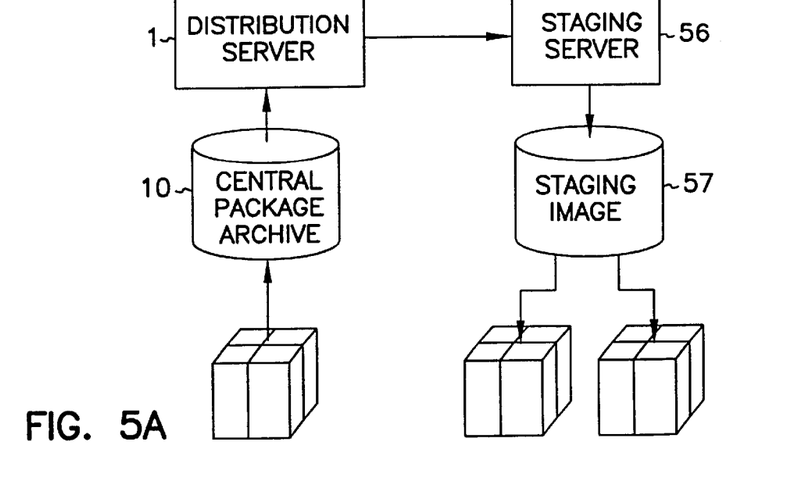
Figure 5B:
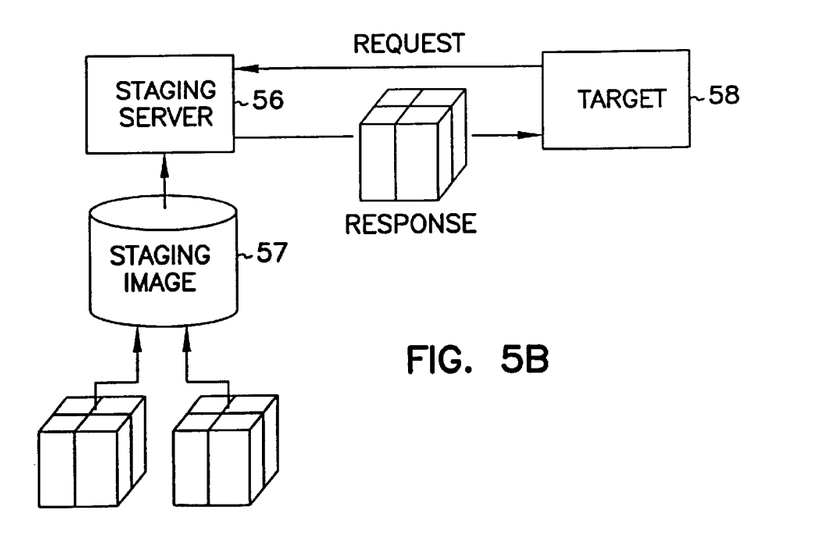

FIG. 5 shows the special case of a Staging Server and an Off-line Target. Not all computers are electrically connected to the internetwork at all times. They are sometimes "off-line". Therefore, a mechanism is implemented in the present invention to accommodate computers which connect occasionally. The mechanism is called a Staging Server (56), which is a computer to which an Off-line Target (58) is assigned. The Network Management Server (1) transmits packages from the Central Package Archive (10) to one or more Staging Servers (56). Each Staging Server stores the Package for the Off-line Target in its Staging Image (57) on its local disk. When an Off-line Target (58) connects to the internetwork, and requests its packages from the Staging Server (56), the Staging Server (56) draws queued packages from its Staging Image (57) and transmits them to the Off-line Target (58).

Figure 6:
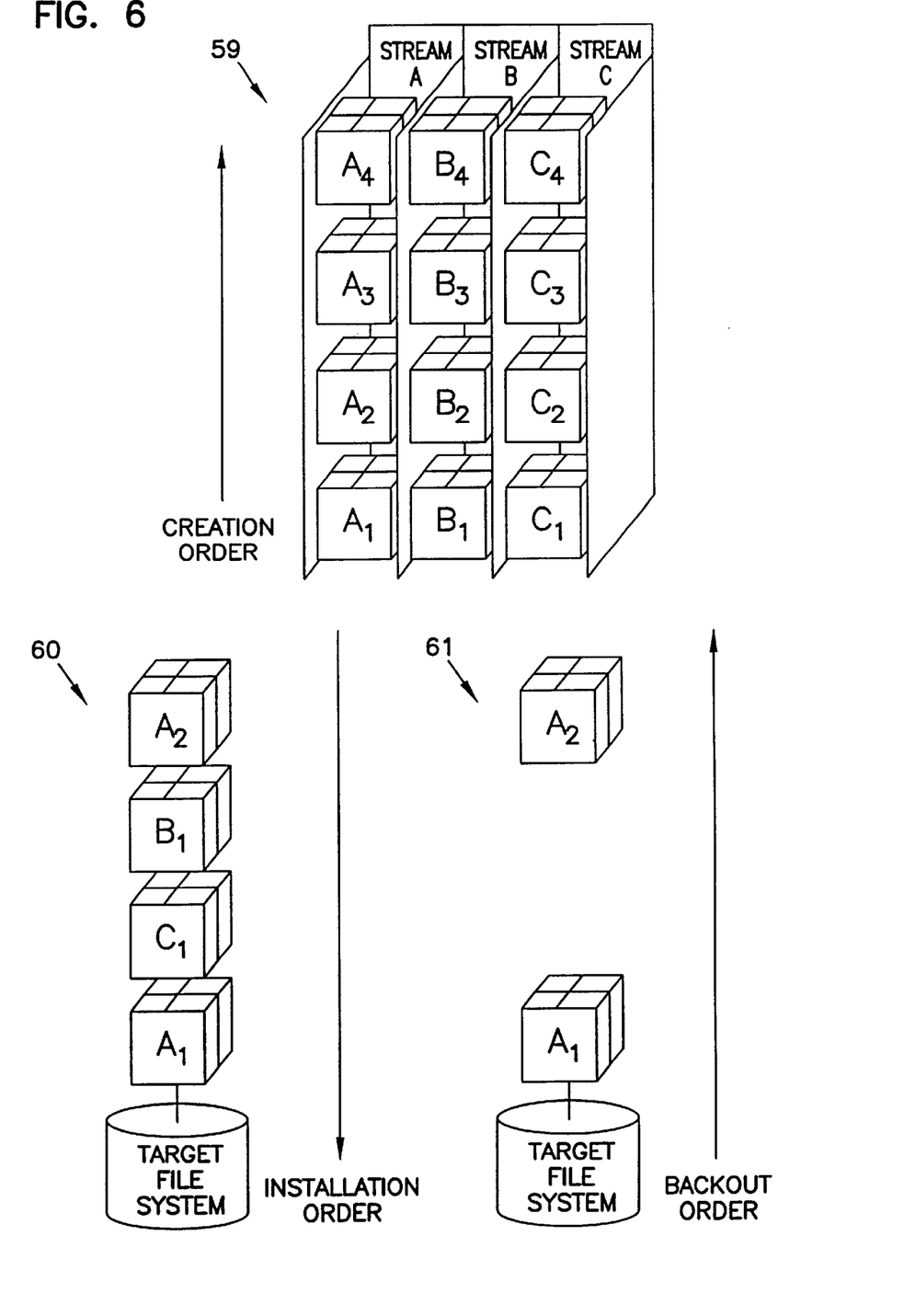
FIG. 6 is a block diagram showing the relationship between Packages and Package Streams.

FIG. 6 shows how Distribution Streams make Profile-based Distribution more flexible. Profiles are a mechanism to enforce software uniformity throughout the internetwork. A Profile is a set of Target computers, wherein each Target can belong to at most one Profile, and each member of a Profile has identical mission-critical software (as specified by the enterprise using the invention). Packages which contain mission-critical software are marked at a creation-time as authorized for transfer to specific Profiles. The Package can then only be transferred to those Profiles. A Package transferred to a Profile must install successfully on all members of that Profile. Before a Profile-bound Package may be scheduled for transfer to a Profile, it must be certified as error-free. When it is certified, the date and time of the certification is recorded. Packages must be transferred to a Profile in the chronological order that they were certified. That is, if packages A, B, and C are certified in that order, then they must be transferred to the Profile members in that order. They must also be backed out in the reverse order of installation. That is, C then B then A. This means that if package A must be backed out after B and C have been installed, C and then B must be backed out from all Profile members before A can be backed out. Since B and C are likely to be unrelated functionally to A, this could cause disruption on the Profile member machines in unintended areas. This problem is solved by the use of Distribution Streams.

Distribution Streams segregate Distribution Packages according to the data files that they affect. That is, Packages in stream A only manipulate a specified set of data files on any Profile member (59). Packages in stream B do not manipulate files specified as belonging to stream A or C. In this way, Packages can be certified and sent to Profile members in the order certified (60), but be backed out according to the stream to which they belong (61). Thus, if Package A1 is to be backed out, B1 and C1 may be safely left in place, and only A2 must be removed first. Since A2 is now likely to be related to A1, there is less likelihood of unintended affects of a backout.

Figure 7:
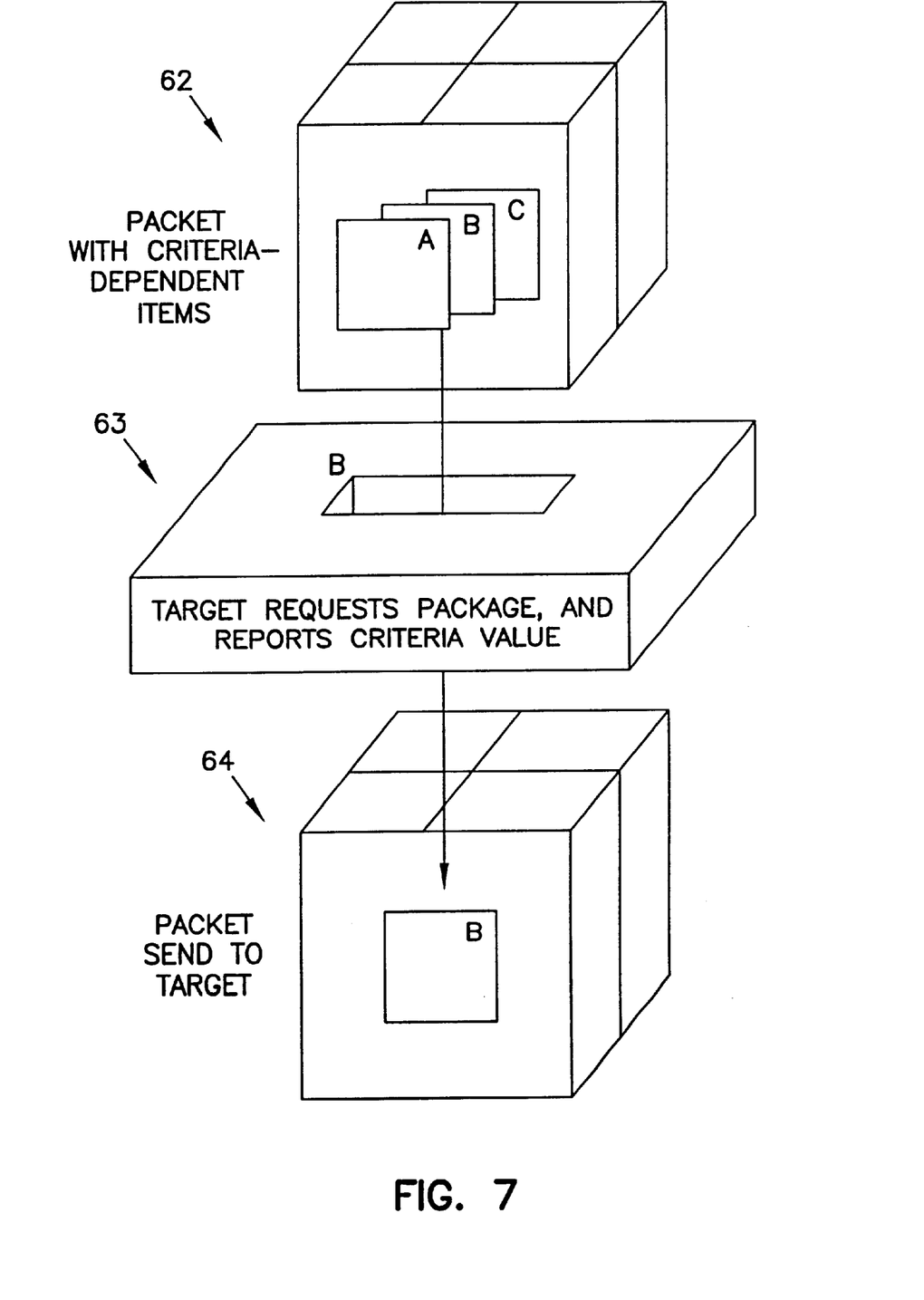
FIG. 7 is a block diagram showing the function of Distribution Criteria in the invention.

FIG. 7 shows the Criteria mechanism, used to customize packages for installation on an heterogeneous set of computers. Often, computers of the same type have different hardware and software configurations. Thus, one Native Package Environment (See FIG. 2) may not represent all possible Target configurations. To avoid requiring a different Package for each possible configuration, the concept of Criteria was invented. Each package may optionally contain criteria-dependent items within it. That is, for any given data file or method intended for the Target computer, the Package may contain several optional data files or methods (62). When the Target requests the Package, it reports its values for known criteria. The Transfer Daemon then removes optional data files and methods which are inappropriate for that criteria value (63). The modified package (64) received by the Target contains only appropriate data files and methods.

Figure 8:
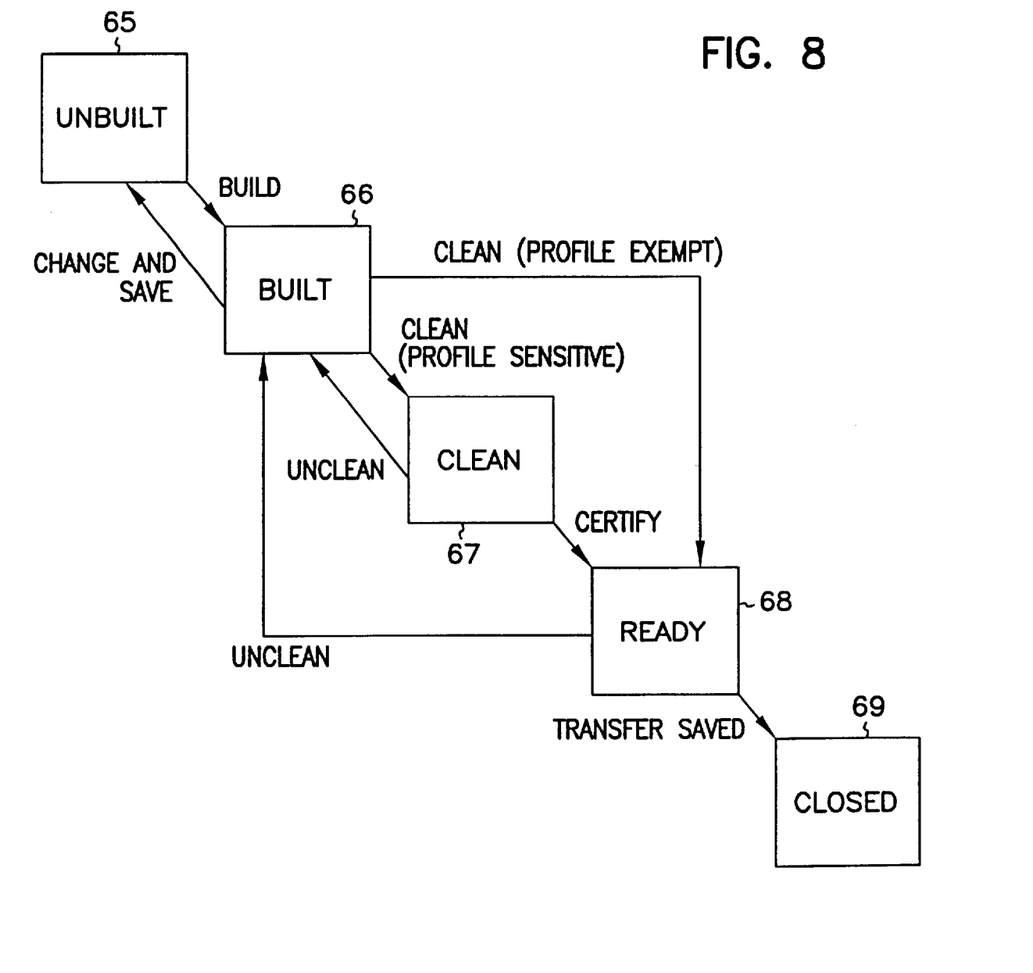
FIG. 8 is a block diagram showing the finite state machine for Software Packages.

FIG. 8 is a block diagram showing the finite state machine for Software Packages. Software Packages are stored in the Central Package Archive on the Network Management Server. As they are constructed and transferred to targets, their status changes in the Central Package Archive. When they are created, they are identified as Unbuilt (65). This indicates that the contents and methods of the Software Package have not been combined into an object for transmission. When the package is built (that is, combined into an object for transmission) the package is placed into Built status (66). Any time the Software Package contents or identifying information are modified and saved, the Software Package is returned to an Unbuilt (65) status. When a Software Package is Cleaned (that is, the methods and data are deleted from the Central Package Archive, leaving only an object for transmission) the package status is changed again. If the Software package is Profile-Sensitive (that is, authorized for one or more Profiles) then the status is changed to Clean (67). The package may be Uncleaned to restore the separate methods and data from the Software Package object, and to return its status to Built (66). If the Software Package is Profile-Exempt (that is, it may be transferred to individual targets or groups of targets) then the status is changed to Ready (68). Uncleaning a Profile-Exempt Software Package changes its status to Built (66). When a Profile-Sensitive Software Package is Certified for one or more Profiles (that is, it is approved as error-free and so indicated in the Central Package Archive) its status is changed to Ready (68). Once the status for a Software Package is set to Ready (68), it may be transferred to its designated target. Profile-Exempt Software Packages may be sent to Targets or groups of Targets; Profile-Sensitive Software Packages may be sent to the one or more Profiles for which it is Certified. Once a Software Package is transferred to any Target, its status is set to Closed (69), and it may not be removed from the Central Package Archive.

What is claimed is:

1. A memory in a software distribution server for storing data and code for forming a software package for transfer to at least one destination computer, the memory comprising:

data stored in said memory; and code stored in said memory for performing methods for acting on said data, said code including a collection method capable of collecting data from at least one destination computer to be send to at least one other destination computer, at least one of a dynamic file manifest which specifies at least one of files to collect when the software package is being formed in the software distribution server and files to collect during data collection at the at least one destination computer, and a package file manifest specifying files contained in the software package and including information relating to these files.

2. A memory as recited in claim 1, wherein said package file manifest specifies information relating to any files contained in the software package including their attributes and their sizes.

3. A memory as recited in claim 1, wherein said code stored in said memory further comprises code for performing at least one of an installation method capable of being activated on each destination computer system for installing the software package thereon and a backout method for backing out and removing the software package from the at least one destination computer if installation of the software package fails.

4. A memory in a software distribution server for storing data and code for forming a software package for transfer to at least one destination computer, the memory comprising:

data stored in said memory; and code stored in said memory for performing methods for acting on said data, said code including;

a system administration command method capable of performing one or more administration functions on the at least one destination computer and a reverse system administration command method capable of reversing effects of the system administration command method on the at least one destination computer if the system administration command method fails when being performed, and a package file manifest specifying files contained in the software package and including information relating to any files contained in the software package.

5. A memory as recited in claim 4, wherein said package file manifest specifies information relating to any files contained in the software package including their attributes and their sizes.

6. A memory as recited in claim 4, wherein said code stored in said memory further comprises code for performing at least one of an installation method capable of being activated on each destination computer system for installing the software package thereon and a backout method for backing out and removing the software package from the at least one destination computer if installation of the software package fails.

7. A memory as recited in claim 6, wherein said code stored in said memory further comprises code for performing at least one of a pre-build method capable of being activated prior to forming the software package for transfer, a post-build method capable of being activated after forming the software package, a pre-install method capable of being activated on each said at least one destination computer prior to installing the software package on the at least one destination computer, a post-install method capable of being activated on said at least one destination computer after the software package is successfully installed on said at least one destination computer, a pre-backout method capable of being activated on said at least one destination computer prior to backing the software package out of the at least one destination computer if installation of the software package fails, a post-backout method capable of being activated on said at least one destination computer after a successful backout of the software package on the at least one destination computer.

8. A memory as recited in claim 7, wherein said pre-build method and said post-build methods are capable of being performed each time the software package is transferred.

9. A memory as recited in claim 7, wherein said code for performing the pre-build method includes code for extracting information from a database and placing the information into an archive prior to the software package being formed.

10. A memory as recited in claim 9, wherein said code for performing the pre-build method includes code for extracting the information from the database and placing the information into an archive each time the software package is transferred.

11. A memory in a software distribution server for storing data and code for creating a software package for transfer across at least one computer network to at least one destination computer, the memory comprising:

data stored in said memory; and code stored in said memory for performing methods for acting on said data, said code including;

at least one of a pre-build method capable of being activated prior to forming the software package for transfer, a post-build method capable of being activated after forming the software package, a pre-install method capable of being activated on each said at least one destination computer prior to installing the software package on the at least one destination computer, a post-install method capable of being activated on said at least one destination computer after the software package is successfully installed on said at least one destination computer, a pre-backout method capable of being activated on said at least one destination computer prior to backing the software package out of the at least one destination computer if installation of the software package fails, a post-backout method capable of being activated on said at least one destination computer after a successful backout of the software package on the at least one destination computer, an installation method capable of being activated on the at least one destination computer for installing the software package on the at least one destination computer, a backout method for backing out and removing the software package from the at least one destination computer, and a package file manifest including information relating to any files contained in the software package.

12. A memory as recited in claim 11, wherein said file manifest specifies the files contained in the software package, their attributes and their sizes.

13. A computer signal embodied in a transmission medium comprising data and code forming a software package for transfer from a software distribution server to at least one destination computer, the computer signal comprising:

code for performing methods for acting on said data, said code including a collection method capable of collecting data from at least one destination computer to be send to at least one other destination computer, at least one of a dynamic file manifest which specifies at least one of files to collect when the software package is being formed in the software distribution server and files to collect during data collection at the at least one destination computer, and a package file manifest specifying files contained in the software package and including information relating to these files.

14. A computer signal embodied in a transmission medium as recited in claim 13, wherein said package file manifest specifies information relating to any files contained in the software package including their attributes and their sizes.

15. A computer signal embodied in a transmission medium as recited in claim 13 further comprising code for performing at least one of an installation method capable of being activated on each destination computer system for installing the software package thereon and a backout method for backing out and removing the software package from the at least one destination computer if installation of the software package fails.

16. A computer signal embodied in a transmission medium comprising data and code forming a software package for transfer from a software distribution server to at least one destination computer, the computer signal comprising:

code for performing methods for acting on said data, said code including;

a system administration command method capable of performing one or more administration functions on the at least one destination computer and a reverse system administration command method capable of reversing effects of the system administration command method on the at least one destination computer if the system administration command method fails when being performed; and a package file manifest including information relating to any files contained in the software package.

17. A computer signal embodied in a transmission medium as recited in claim 16, wherein said package file manifest specifies information relating to any files contained in the software package including their attributes and their sizes.

18. A computer signal embodied in a transmission medium as recited in claim 16, wherein said code further comprises code for performing at least one of an installation method capable of being activated on each destination computer system for installing the software package thereon and a backout method for backing out and removing the software package from the at least one destination computer if installation of the software package fails.

19. A computer signal embodied in a transmission medium as recited in claim 16, wherein said code further comprises code for performing at least one of a pre-build method capable of being activated prior to forming the software package for transfer, a post-build method capable of being activated after forming the software package, a pre-install method capable of being activated on each said at least one destination computer prior to installing the software package on the at least one destination computer, a post-install method capable of being activated on said at least one destination computer after the software package is successfully installed on said at least one destination computer, a pre-backout method capable of being activated on said at least one destination computer prior to backing the software package out of the at least one destination computer if installation of the software package fails, a post-backout method capable of being activated on said at least one destination computer after a successful backout of the software package on the at least one destination computer.

20. A computer signal embodied in a transmission medium as recited in claim 19, wherein said pre-build method and said post-build methods are capable of being performed each time the software package is transferred.

21. A computer signal embodied in a transmission medium as recited in claim 19, wherein said code for performing, the post-build method includes code for extracting information from a database and placing the info-nation into an archive prior to the software package being formed.

22. A computer signal embodied in a transmission medium as recited in claim 19, wherein said code for performing the pre-build method includes code for extracting the information from the database and placing the information into an archive each time the software package is transferred.

23. A computer signal embodied in a transmission medium comprising data and code for creating a software package for transfer from a software distribution server to at least one destination computer, the computer signal comprising:

code for performing methods for acting on said data, said code including code for performing at least one of a pre-build method capable of being activated prior to forming the software package for transfer, a post-build method capable of being activated after forming the software package, a pre-install method capable of being activated on each said at least one destination computer prior to installing the software package on the at least one destination computer, a post-install method capable of being activated on said at least one destination computer after the software package is successfully installed on said at least one destination computer, a pre-backout method capable of being activated on said at least one destination computer prior to backing the software package out of the at least one destination computer if installation of the software package fails, a post-backout method capable of being activated on said at least one destination computer after a successful backout of the software package on the at least one destination computer;

an installation method capable of being activated on the at least one destination computer for installing the software package on the at least one destination computer;

a backout method for backing out and removing the software package from the at least one destination computer if installation of the software package fails; and a package file manifest including information relating to any files contained in the software package.

24. A computer signal embodied in a transmission medium as recited in claim 23, wherein said file manifest specifics information relating to any files contained in the software package including their attributes and their sizes.

* * * * *